United States Patent [19]

Diggs

[11] Patent Number: 5,490,486

[45] Date of Patent: Feb. 13, 1996

[54] EIGHT CYLINDER INTERNAL COMBUSTION ENGINE WITH VARIABLE DISPLACEMENT

[75] Inventor: Matthew B. Diggs, Farmington, Mich.

[73] Assignee: Ford Motor Company, Dearborn, Mich.

[21] Appl. No.: 318,407

[22] Filed: Oct. 5, 1994

[51] Int. Cl.$^6$ ..................................................... F02B 77/00
[52] U.S. Cl. ............................................................ 123/198 F
[58] Field of Search ............................................ 123/198 F

[56] References Cited

U.S. PATENT DOCUMENTS

| | | |
|---|---|---|
| 4,040,395 | 8/1977 | Demetrescu . |
| 4,144,864 | 3/1979 | Kato et al. . |
| 4,173,209 | 11/1979 | Jordan ................................ 123/198 F |
| 4,188,933 | 2/1980 | Iizuka . |
| 4,224,920 | 9/1980 | Sugasawa et al. . |
| 4,354,471 | 10/1982 | Sugasawa et al. . |
| 4,384,556 | 5/1983 | Ohlendorf et al. .................. 123/198 F |
| 4,484,551 | 11/1984 | Choma et al. . |
| 4,494,502 | 1/1985 | Endo et al. . |
| 4,509,488 | 4/1985 | Forster et al. . |
| 4,541,387 | 9/1985 | Morikawa . |
| 4,550,704 | 11/1985 | Barho et al. . |
| 4,552,114 | 11/1985 | Sano et al. . |
| 4,556,026 | 12/1985 | Masuda et al. . |
| 4,655,187 | 4/1987 | Gravestock . |
| 4,708,108 | 11/1987 | Sakamoto et al. . |
| 4,722,411 | 2/1988 | Ohashi et al. . |
| 4,870,934 | 10/1989 | Vanetta et al. . |
| 4,962,740 | 10/1990 | Fujimoto et al. . |
| 4,976,228 | 12/1990 | Kawamura . |
| 5,035,220 | 7/1991 | Uchinami et al. . |
| 5,042,444 | 8/1991 | Hayes et al. . |
| 5,099,816 | 3/1992 | Ohga et al. . |
| 5,113,823 | 5/1992 | Iriyama . |
| 5,119,781 | 6/1992 | Trombley et al. . |
| 5,124,922 | 6/1992 | Akiyama . |
| 5,190,013 | 3/1993 | Dozier . |
| 5,213,081 | 5/1993 | Fujimoto . |

FOREIGN PATENT DOCUMENTS 404041944A 12/1992 Japan .

OTHER PUBLICATIONS

"4, 6, 8 . . . Which Cylinder Shall We Operate?", *MOTOR*, Jun. 25, 1983, pp. 52–53.
D. Stojek and D. Bottomley, "The Ford 3x6 Engine", Proceedings IMech vol. 198D, No. 15.
G. Berta, M. Troilo, "Cylinder Shut–off and Pressure Charging for Lower Fuel Consumption", SAE 82072.
K. Schellman and W. Schmid, "Possibilities by Saving Fuel by Switching Off Cylinders", Fuel Economy Research Conference, Unknown data & location.
T. Fukui, T. Nakagami, H. Endo, T. Katsumoto and Y. Danno, "Mitsubishi Orion–MD, A New Variable Displacement Engine, " SAE 831007.
B. Bates, J. Dosdall and D. Smith, "Variable Displacement by Engine Valve Control", SAE Paper 780145, 1978.
"Mitsubishi has variable 2 or 4–cylinder engine, " Wards Engine and Vehicle Technology Update, Sep. 1, 1992.
"Mitsubishi unveils new fuel savings engine", recent article in Automotive News, Aug.–Sep. 1992.

*Primary Examiner*—Noah P. Kamen
*Attorney, Agent, or Firm*—Jerome R. Drouilard; Roger L. May

[57] ABSTRACT

An eight cylinder internal combustion engine includes a cylinder block arranged in a V-type configuration with a left bank of four cylinders and a right bank of four cylinders. An engine control as a first common control element which operates the intake valves with a first pair of cylinders located in the left bank and a second common control element which operates the exhaust valves of the same first pair of cylinders with a third common control element operating the intake valves of a second pair of cylinders located on the right bank, and a fourth control element operating the exhaust valves of the same second pair of cylinders in the right bank. With only four switchable power sources, the engine may be operated on either four or eight cylinders depending upon the power output need of the vehicle in which the engine is installed.

13 Claims, 5 Drawing Sheets

5,490,486

EIGHT CYLINDER INTERNAL COMBUSTION ENGINE WITH VARIABLE DISPLACEMENT

BACKGROUND OF THE INVENTION

The present invention relates to an eight cylinder internal combustion engine having a variable displacement operational capability in which the engine may be run with only four of the cylinders activated.

Disclosure Information

Designers of internal combustion engines have long realized that it is possible to achieve greater thermal efficiency in the event that the engine is operated at fewer than the maximum number of cylinders at light loads. When an engine is operated with fewer number of cylinders than its maximum number, it is possible to obtain greater fuel economy because throttling losses may be minimized. The highest efficiency is yielded if the cylinders are deactivated such that no fuel, nor air, flows in or out of the cylinders. Of course, this requires that both the intake and exhaust valves associated with any particular deactivated cylinder be disabled. Many schemes have been attempted for accomplishing disablement, but no systems have required inordinately complicated and expensive electronic controls to achieve the desired disablement of cylinders. Certain prior art systems also have suffered from the problem that exhaust emission control was impaired because the intake and exhaust valves were disabled simultaneously, with the result that the contents of the disabled cylinders could not be reliably determined. As a result, the gas trapped within the disabled cylinders could be air, fuel/air, or exhaust. The varying nature of the mixture could cause an uneven oxygen concentration in the engine's exhaust, thereby complicating the task of treating the exhaust catalytically. The present invention solves the problems of cost, complexity and precision of control associated with prior systems by providing four cylinder operation of an eight cylinder engine using only four switchable power sources to operate a total of eight engine valves on both banks of a V-type engine, with cylinder deactivation occurring in a timed fashion such that exhaust gas is always trapped within the disabled cylinders. The present system is advantageous because of this reduced complexity and cost and increased emission control capability.

Summary of the Invention

An eight cylinder internal combustion engine includes a cylinder block arranged in a V-type configuration and having a left bank of four cylinders and a right bank of four cylinders. A plurality of intake poppet valves admits air and fuel into each of the cylinders, and a plurality of exhaust poppet valves allows combustion products to be discharged from the cylinders. At least one intake valve and at least one exhaust valve services each cylinder. A plurality of valve actuators selectively opens the poppet valves in timed relation to the crankshaft, which is rotatably mounted within the engine. An engine control operates the valve actuator so as to disable certain cylinders of the engine by rendering inoperative the intake and exhaust valves associated with such cylinders. The controller has a first common control element which operates the intake valves of the first pair of cylinders located in the left bank, a second common control element which operates the exhaust valves of the first pair of cylinders, a third common control element which operates the intake valves of the second pair of cylinders located in the right cylinder bank, and a fourth common control element which operates the exhaust valves of the second pair of cylinders.

Each valve actuator preferably comprises a mechanically lockable camshaft follower and a locking solenoid for locking the follower, with each of the four common control elements comprising a single power driver for operating the locking solenoids associated with either the intake or exhaust valves of either the first or second pair of cylinders. The controller operates the valve actuators such that the intake valves and exhaust valves of all of the cylinders being disabled are rendered inoperative during fewer than two revolutions of the crankshaft at engine speeds of less than 5000 rpm. With the intake valve for each cylinder being disabled before the exhaust valve for the same cylinder being disabled, such that only exhaust gas is confined within the cylinder during any period in which the cylinder is disabled. According to the present invention, the two inner cylinders on one bank and the two outer cylinders on the opposing bank are disabled by the controller.

DETAILED DESCRIPTION OF THE PREFERRED EMBODIMENTS

Figure 1:
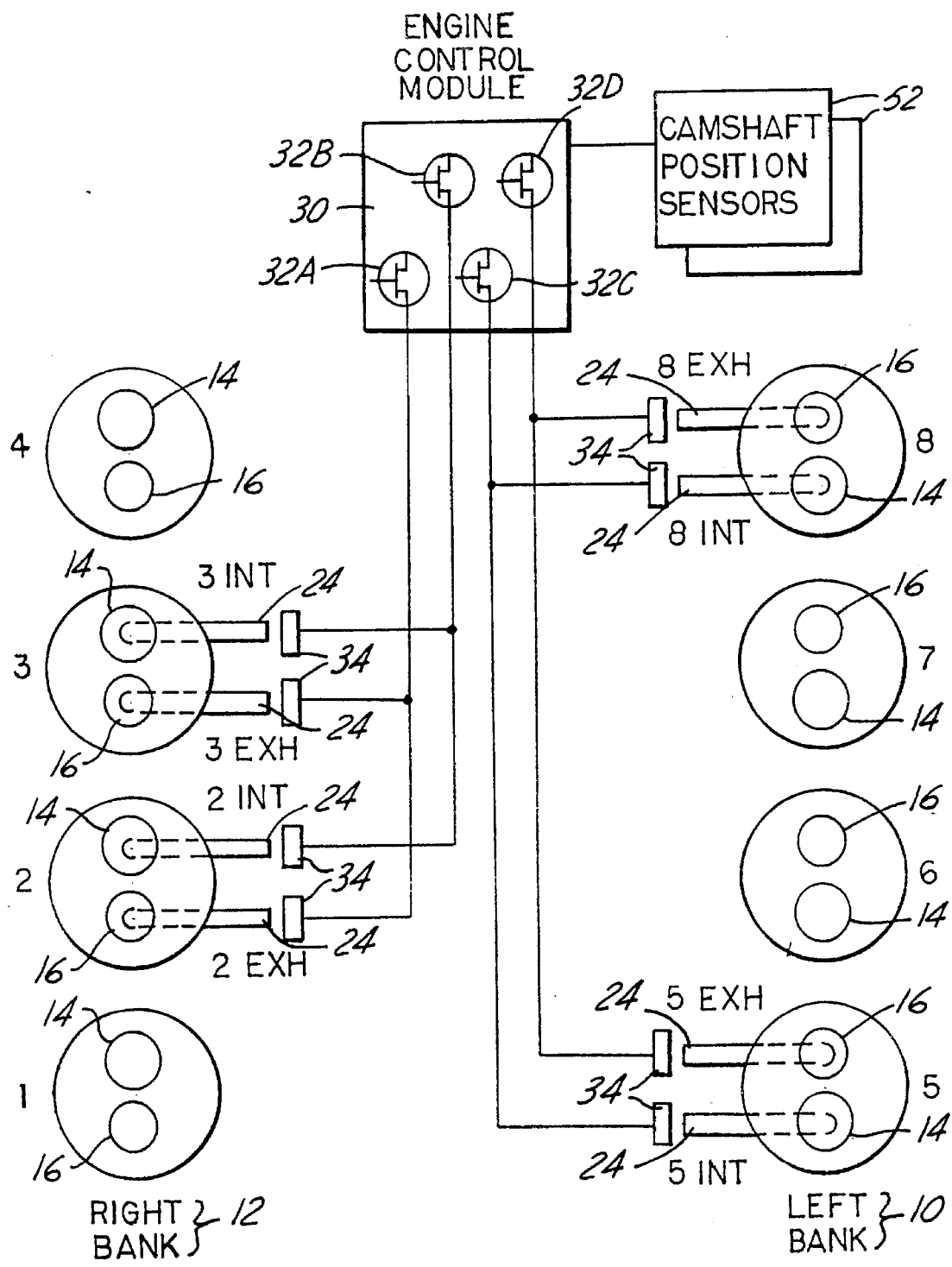
FIG. 1 is a schematic representation of an engine and control system according to an aspect of the present invention.

As shown in FIG. 1, an eight cylinder internal combustion engine has a cylinder block arranged in a V-type configuration with a left bank of cylinders 10 and a right bank of cylinders 12. The left bank has cylinders 5, 6, 7, and 8, and the right bank has cylinders 1, 2, 3, and 4, which are numbered as shown in FIG. 1. Each of the engine cylinders has one intake poppet valve 14 and one exhaust poppet valve 16. Those skilled in the art will appreciate in view of this disclosure that a system according to the present invention could be used with multi-valve engines having more than one intake valve and more than one exhaust valve per cylinder. In conventional fashion, the intake valves allow air and fuel into each of the cylinders, and the exhaust valves allow combustion products to be discharged from the cylinders. FIG. 1 also illustrates engine controller 30 for operating the valves of the engine. The valves are operated via valve actuators or camshaft followers 24 which serve to disable cylinders 2, 3, 5, and 8 by rendering intake valves 14 and exhaust valves 16 inoperative.

Figure 3:
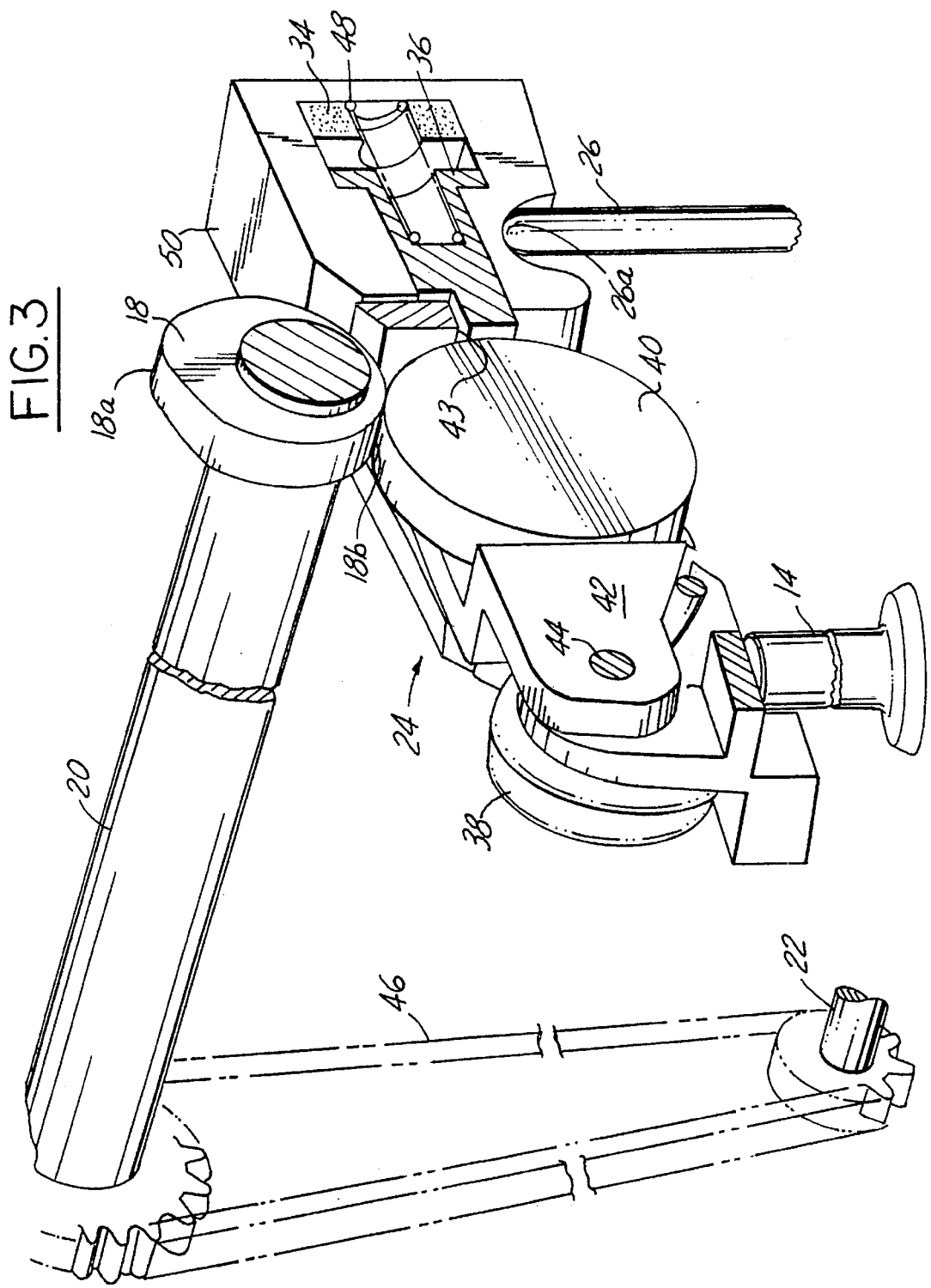
FIG. 3 is a schematic representation of a valve train according to another aspect of the present invention.

Controller 30 includes four drivers 32 which are connected with solenoids 34 incorporated in camshaft followers 24, which are shown with particularity in FIG. 3. Each of drivers 32 is connected with the either the intake valves or the exhaust valves of one pair of cylinders located in either the left or right bank of the engine. Accordingly, driver A, labeled "32A" in FIG. 1, controls only those solenoids 34 which are associated with the camshaft followers 24 which open the exhaust valves for cylinders 2 and 3. Driver 32B controls the intake valves for cylinders 2 and 3. On the left cylinder bank, driver 32C controls the exhaust valves for cylinders 5 and 8, whereas driver 32D controls the intake valves for cylinders 5 and 8. Thus, controller 30 has four common controller elements, i.e., the drivers 32A–32D, with each comprising a means for operating locking solenoids associated with either the intake or exhaust valves of either the first or second pair of engine cylinders. The engine cylinders may be rendered inoperative during fewer than two revolutions of the crankshaft at engine speeds less than 5000 rpm.

Details of the valve follower 24 are shown in FIG. 3. Crankshaft 22 is shown as driving camshaft 20 via chain 46. Those skilled in the art will appreciate in view of this disclosure that a system according to the present invention could be operated with not only a chain but also gears or other types of devices known to those skilled in the art and suggested by this disclosure. Moreover, a system according to the present invention could be employed with engines having either one or two overhead camshafts.

In any event, camshaft 20 has a plurality of lobes 18 attached thereto (only one cam lobe is shown). Cam lobe 18 contacts a roller 40, which is associated with one of followers 24. When the nose, 18a, of cam lobe 18 contacts roller 40, the corresponding poppet valve, in this case, one of intake valves 14, as shown, will be contacted by follower 24 and pushed to an open position. Simultaneously, lash adjuster 26 acts as a fulcrum for follower 24.

Each of followers 24 comprises a mechanically lockable camshaft follower with locking solenoid. This is accomplished by means of solenoid coil 34, which is energized by one of drivers 32A, B, C, or D. When one of drivers 32 supplies current to solenoid coil 34, solenoid plunger 36 will be retracted from its resting position, which is the result of spring 48 pushing plunger into a locked position. As further shown in FIG. 3, when solenoid plunger 36 is in the locked, or extended, position, carrier 42 is prohibited from rotating about carrier pivot 44. In other words, carrier 42 is locked in a fixed position with body 50 of camshaft follower 24. As a result, carrier 42 and body 50 will pivot as one unit about ball 26a at the uppermost part of lash adjuster 26. As a result, valve 14 will be depressed when camshaft lobe 18 depresses roller 40 and carrier 42. If, on the other hand, solenoid coil 34 is energized by one of drivers 32, solenoid plunger 36 will be pulled back in the retracted position such that plunger 36 does not contact abutment 43 and as a result carrier 42 will be allowed to pivot about carrier pivot 44, and the valve 14 or 16, as the case may be, associated with follower 24 will not be depressed because as cam lobe 18 contacts roller 40, carrier 42 will merely pivot in a downward direction against the force of spring 38.

Figure 2:
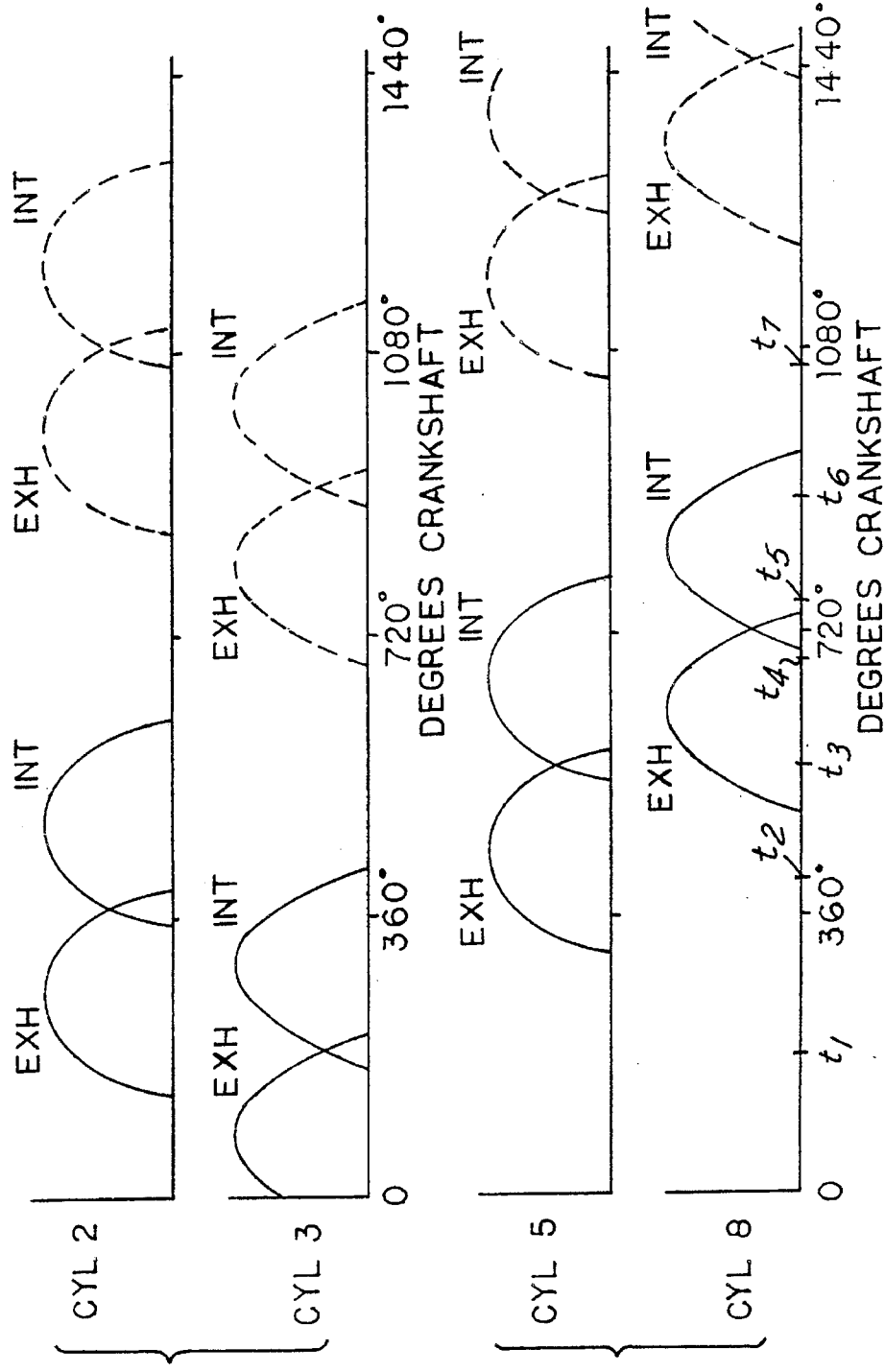
FIGS. 2a and b are timing diagrams showing disablement of valves according to another aspect of the present invention.

FIG. 2 shows the details of the deactivation of valves and cylinders according to the present invention. The present system is advantageous because the four cylinder engine produced by deactivating the cylinders, as described below, is an even-firing four cylinder, four stroke cycle engine. Beginning with FIG. 2A, which pertains to the right bank of cylinders, cylinders 2 and 3 are shown as having intake and exhaust events which are portrayed as the opening and closing of the intake and exhaust valves on the ordinate, as plotted against time or degrees crankshaft rotation, on the abscissa.

At time $t_1$, driver A is closed, and as a result, the exhaust valves in cylinders 2 and 3 begin the deactivation process. Notice that the closing of driver A slightly lags the onset of the opening of the exhaust valve on cylinder 2. The timing of the driver closing is done in this manner because once the cam lobe 18 for a cylinder being deactivated contacts roller 40 for that cylinder, solenoid 34 is incapable of withdrawing solenoid plunger 36, due to the extremely high friction existing between carrier abutment 43 and solenoid plunger 36. Closing of the driver at point $t_1$ does, however, allow the exhaust valve follower 24 of cylinder 3 an adequate amount of time to be disabled before the next exhaust event starts for cylinder 3 at time $t_4$. At time $t_2$, driver B is closed, thereby beginning the deactivation process for intake valves 14 in cylinders 2 and 3. As before, the intake valve for cylinder 2 will not become deactivated until the base circle, 18b, of camshaft lobe 18 is in contact with roller 40 because of the high friction between carrier abutment 43 and solenoid plunger 36. Accordingly, the intake valve is deactivated at time $t_6$ when the intake valve for cylinder 2 would otherwise be called upon to open up. Notice that the intake valve for cylinder 3 is deactivated at time $t_7$.

The deactivation of cylinders 5 and 8 are similar to that of cylinders 2 and 3. In each case, the deactivation is begun on any particular cylinder such that the energization of the switchable power source or driver occurs at a time which slightly lags the onset of the valve event of the first of the valves being controlled by the energization, with the energization leading onto the valve event of the second valve being controlled by the energization such that the second valve is disabled prior to the disablement of the first valve. In this case, "first" and "second" refers to the order in which the valves are normally actuated by the camshaft and followers 24. Because the exhaust valve for each selected cylinder is disabled before the intake valve for the same cylinder is disabled, only exhaust gas confined within the cylinder during any period in which the cylinder is disabled. The fact that confinement of gas in the cylinder is limited to exhaust gas, it is important because it prevents air/fuel ratio of the feed gases flowing to any catalytic aftertreatment device from being disturbed due to an unwanted concentration of oxygen, fuel, or other substances which could be found in the exhaust of the engine should the disablement not be handled properly. Deactivation in the illustrated sequence is possible only because, as is shown in FIG. 1, controller 30 is connected with at least one camshaft position sensor 52. Each of camshaft position sensors 52, as its name implies, senses the position of one of camshafts 20 and relays to controller 30 a signal corresponding to the position of the camshaft. Because controller 30 is informed of the position of camshaft 20, the controller is able to activate drivers 32 at the times and positions described above to achieve the trapping of exhaust gas described above. Those skilled in the art will appreciate that several different types of camshaft position sensors, which are commonly employed in the electronic engine control art for the purpose of controlling spark timing and other engine events, could be employed in a system according to the present invention.

The process of reactivating the valves which were previously disabled to render the engine operative in only four cylinders is similar to the deactivation process. In the case of reactivation, engine control 30 simultaneously de-energizes each of the solenoid coils 34 connected with any one of the drivers 32A–D. The de-energization occurs at a time which slightly lags the onset of the pseudo valve event of the first of the valves being controlled by the de-energization, while leading the onset of the pseudo valve event of the second valve being controlled by the de-energization such that the second valve is enabled prior to the enablement of the first valve. In this case, the term "pseudo valve event" refers to the fact that when the valves are disabled, the camshaft lobes 18 still contact the rollers 40 and cause displacement of carriers 42 without, of course, concomitant motion of the valves into their open and closed positions. In other words, a pseudo event occurs when the various mechanical portions of the system linked directly with camshaft 20 continue their normal kinematics, but without the locking necessary to produce a valve opening.

Figure 4:
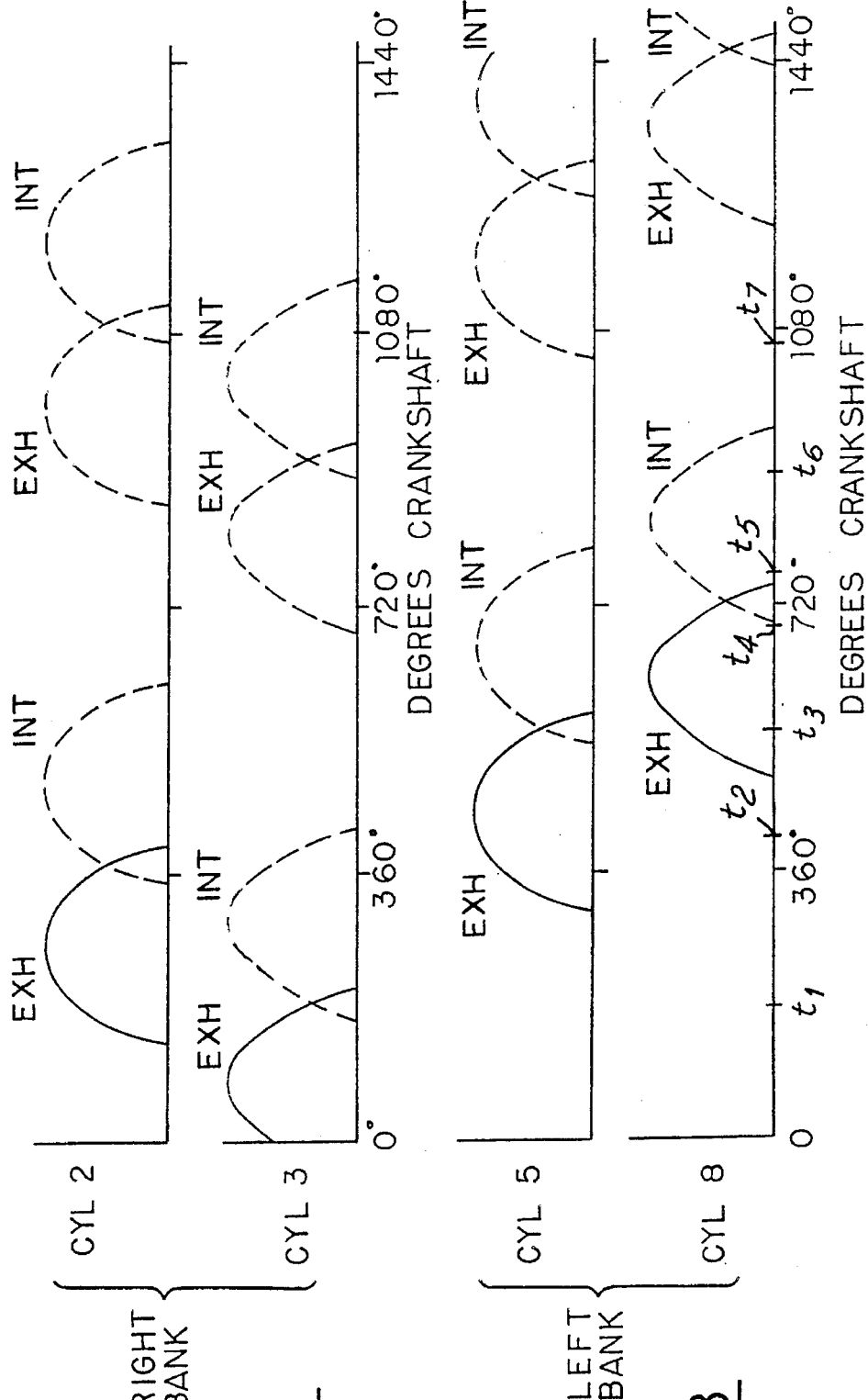
FIGS. 4a and b are timing diagrams showing disablement of valves according to another aspect of the present invention.

Those skilled in the art will appreciate in view of this disclosure that although the previously described system operation involved disablement of the exhaust valve of any particular cylinder prior to disablement of the intake valve for the same cylinder, it is likely that in certain situations it may be more advantageous to disable the intake valve(s) of any particular cylinder first, followed by the exhaust valve(s) for the same cylinder. This may be accomplished according to FIG. 4 by disabling the intake valve of cylinder 3, for example at time ,1, with the intake valve of cylinder 2 being disabled at time ,2. Notice that the exhaust valve of cylinder 3 is disabled at time ,4, with the exhaust valve of cylinder 2 being disabled at time ,6. When the intake valve of any particular cylinder is disabled before the exhaust valve is disabled, the result is that a mass of exhaust is trapped within the cylinder which is much less than the mass trapped when the exhaust valve is disabled before the intake valve. In other words, only a partial charge of exhaust gas is trapped in the cylinder. This is advantageous because it avoids the negative torque pulse which may arise when a cylinder full of the maximum weight of exhaust gas is compressed during the compression stroke following disablement of the exhaust valve, followed by an intake stroke and subsequent power stroke. On the other hand, during engine warmup, it may be desirable to trap a full exhaust charge in the disabled cylinders. Controller 30 may be programmed to select which valve to disable first based upon the sensing one of two or more predetermined sets of engine operating conditions. For example, if engine coolant is at a low temperature and the engine is lightly loaded, disablement of the exhaust valve first may be selected. If, however, the engine is fully warmed and engine load is at a moderate level, disablement of the intake valve first may be selected.

Figure 5:
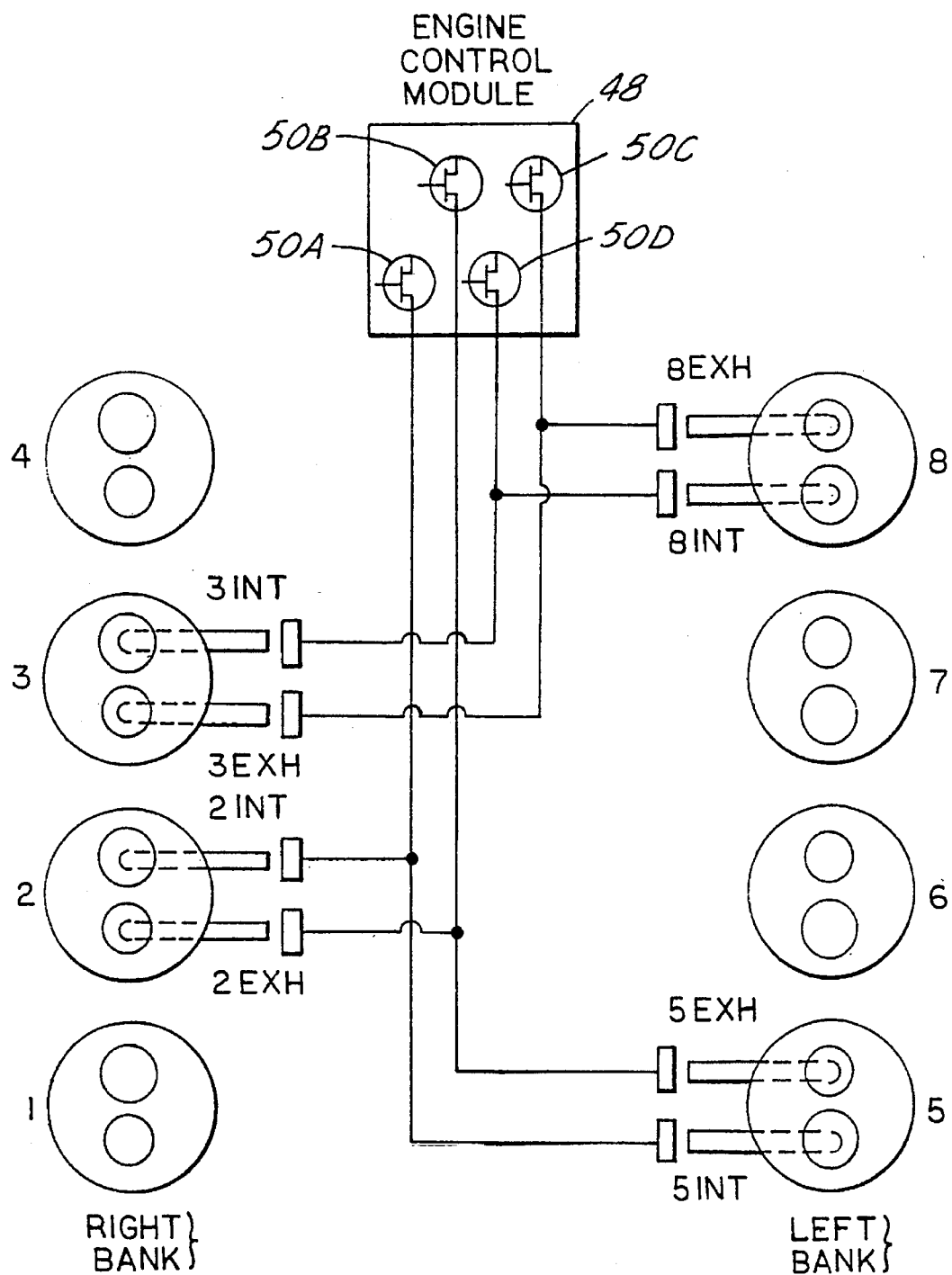
FIG. 5 is a schematic representation of an engine and control system according to another aspect of the present invention.

FIG. 5 is similar to FIG. 1, but shows another aspect of the present invention in which the system architecture dictates that like valves servicing cylinders which have power strokes separated by 180 degrees of crankshaft rotation, but which are in opposite banks of the engine, are powered by a common driver. Accordingly, driver 50A, which is part of engine control module 48, powers the actuators associated with the intake valves of cylinders 2 and 5; driver 50B powers the actuators associated with the exhaust valves of cylinders 2 and 5; driver 50C powers the actuators associated with the exhaust valves of cylinders 3 and 8, and driver 50D powers the actuators associated with the intake valves of cylinders 3 and 8. As before, during the disablement, the engine will operate as an even-firing four cylinder, four stroke cycle engine. Stated another way, controller 48 has a first common control element which operates the intake valves of a first cylinder located in the left bank and a second cylinder in the right bank, a second common control element which operates the exhaust valves of these first and second cylinders, a third common control element which operates the intake valve of a third cylinder located in the left bank and a fourth cylinder in the right bank, and a fourth common control element which operates the exhaust valves of these third and fourth cylinders.

While the invention has been shown and described in its preferred embodiments, it will be clear to those skilled in the arts to which it pertains that many changes and modifications may be made thereto without departing from the scope of the invention.

I claim:

1. An eight cylinder internal combustion engine, comprising:

a cylinder block arranged in a V-type configuration, having a left bank of four cylinders and a right bank of four cylinders;

a plurality of intake poppet valves for admitting air and fuel into each of the cylinders and a plurality of exhaust poppet valves for allowing combustion products to be discharged from the cylinders, with at least one intake valve and at least one exhaust valve for each cylinder;

a plurality of valve actuators for selectively opening said poppet valves in timed relation to a crankshaft which is rotatably mounted within the engine; and an engine controller for operating the valve actuators so as to disable certain cylinders of the engine by rendering inoperative the intake and exhaust valves associated with such cylinders, with said controller having a first common control element which operates the intake valves of a first pair of cylinders located in the left bank, a second common control element which operates the exhaust valves of said first pair of cylinders, a third common control element which operates the intake valves of a second pair of cylinders located in the right bank, and a fourth common control element which operates the exhaust valves of the second pair of cylinders.

2. An engine according to claim 1, wherein said valve actuators each comprise a mechanically lockable camshaft follower and a locking solenoid for locking the follower, with each of said four common control elements comprising a single power driver for operating the locking solenoids associated with either the intake or exhaust valves of either the first or the second pair of cylinders.

3. An engine according to claim 1, wherein said controller operates the valve actuators such that the intake valves and exhaust valves of all of the cylinders being disabled are rendered inoperative during fewer than two revolutions of the crankshaft at engine speeds of less than 5000 rpm, with the intake valve for each cylinder being disabled before the exhaust valve for the same cylinder is disabled, such that only exhaust gas is confined within the cylinder during any period in which the cylinder is disabled.

4. An engine according to claim 1, wherein the two inner cylinders on one bank and the two outer cylinders on the opposing bank are disabled by said controller, with the result that the engine is run as an even-firing, four stroke cycle engine.

5. A reciprocating, eight cylinder internal combustion engine, comprising:

a cylinder block arranged in a V-type configuration, having a left bank of four cylinders and a right bank of four cylinders, with two cylinders of each bank being selectable for disablement, so as to allow the engine to be operated with only the non-selectable four cylinders;

a plurality of intake poppet valves for admitting air and fuel into each of the cylinders and a plurality of exhaust poppet valves for allowing combustion products to be discharged from the cylinders, with at least one intake valve and at least one exhaust valve for each cylinder;

a camshaft, driven by the crankshaft of the engine, for powering said poppet valves;

a plurality of direct solenoid-locked camshaft followers for opening said poppet valves in timed relation to the crankshaft's position, with the followers for the intake and exhaust valves of the selectable cylinders having solenoids for selectively unlocking the followers to as to render inoperable said intake and exhaust valves; and an engine controller for selectively powering said solenoids, with said controller having a first switchable power source connected with the solenoids associated with the valve followers of the intake valves of the selectable cylinders of the left cylinder bank, a second switchable power source connected with the solenoids associated with the valve followers of the exhaust valves of the selectable cylinders of the left bank, a third switchable power source connected with the solenoids associated with the valve followers of the intake valves of the selectable cylinders of the right cylinder bank, and a fourth switchable power source connected with the solenoids associated with the valve followers of the exhaust valves of the selectable cylinders of the right bank.

6. An engine according to claim 5, wherein said controller operates the solenoids such that the intake valves and exhaust valves of all of the cylinders being disabled are rendered inoperative during fewer than two revolutions of the crankshaft at all engine speeds.

7. An engine according to claim 5, wherein said controller operates the solenoids such that the exhaust valve for each selected cylinder is disabled before the intake valve for the same cylinder is disabled, such that a full charge of exhaust gas is confined within the cylinder during any period in which the cylinder is disabled.

8. An engine according to claim 5, wherein said controller operates the solenoids such that the intake valve for each selected cylinder is disabled before the exhaust valve for the same cylinder is disabled, such that a partial charge of exhaust gas is confined within the cylinder during any period in which the cylinder is disabled.

9. An engine according to claim 5, wherein the two inner cylinders on one bank and the two outer cylinders on the opposing bank are disabled by said controller.

10. An engine according to claim 5, wherein the engine controller simultaneously energizes each of the solenoids connected with any particular switchable power source, with each energization occurring at a time which slightly lags the onset of the valve event of the first of the valves being controlled by the energization, but which leads the onset of the valve event of the second valve being controlled by the energization, such that the second valve is disabled prior to the disablement of the first valve.

11. An engine according to claim 5, wherein the engine controller simultaneously de-energizes each of the solenoids connected with any particular switchable power source, with each de-energization occurring at a time which slightly lags the onset of the pseudo valve event of the first of the valves being controlled by the de-energization, but which leads the onset of the pseudo valve event of the second valve being controlled by the de-energization, such that the second valve is enabled prior to the enablement of the first valve.

12. An eight cylinder internal combustion engine, comprising:

a cylinder block arranged in a V-type configuration, having a left bank of four cylinders and a right bank of four cylinders;

a plurality of intake poppet valves for admitting air and fuel into each of the cylinders and a plurality of exhaust poppet valves for allowing combustion products to be discharged from the cylinders, with at least one intake valve and at least one exhaust valve for each cylinder;

a plurality of valve actuators for selectively opening said poppet valves in timed relation to a crankshaft which is rotatably mounted within the engine; and an engine controller for operating the valve actuators so as to disable certain cylinders of the engine by rendering inoperative the intake and exhaust valves associated with such cylinders, with said controller having a first common control element which operates the intake valves of a first cylinder located in the left bank and a second cylinder in the right bank, a second common control element which operates the exhaust valves of said first and second cylinders, a third common control element which operates the intake valve of a third cylinder located in the left bank and a fourth cylinder in the right bank, and a fourth common control element which operates the exhaust valves of the third and fourth cylinders.

13. An engine according to claim 12, wherein said controller operates said control elements such that when a first predetermined set of engine operating conditions is sensed, the intake valves of the cylinders to be disabled are deactivated prior to deactivation of the exhaust valves of such cylinders, with the controller deactivating the exhaust valves of such cylinders prior to disabling the intake valves in the event that a second predetermined set of engine operating conditions is sensed.

* * * * *